United States Patent
Hart et al.

(10) Patent No.: US 9,572,026 B2
(45) Date of Patent: Feb. 14, 2017

(54) LOCATION SERVICES FOR A WIRELESS DEVICE

(71) Applicant: Cisco Technology, Inc., San Jose, CA (US)

(72) Inventors: Brian Donald Hart, Sunnyvale, CA (US); Santosh Pandey, Santa Clara, CA (US); Kayshav Dattatri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 521 days.

(21) Appl. No.: 13/652,594

(22) Filed: Oct. 16, 2012

(65) Prior Publication Data

US 2014/0105395 A1  Apr. 17, 2014

(51) Int. Cl.
*H04L 9/00* (2006.01)
*H04W 12/02* (2009.01)
*H04W 4/02* (2009.01)

(52) U.S. Cl.
CPC ............. *H04W 12/02* (2013.01); *H04W 4/02* (2013.01)

(58) Field of Classification Search
CPC ............. H04L 63/0428; H04L 2209/80; H04L 9/0894; H04L 9/08; H04W 12/04
USPC ........................................................ 380/259
See application file for complete search history.

(56) References Cited

U.S. PATENT DOCUMENTS

| | | |
|---|---|---|
| 2005/0044273 A1 | 2/2005 | Bouchat et al. |
| 2005/0073980 A1 | 4/2005 | Thomson et al. |
| 2005/0076233 A1* | 4/2005 | Aarts .................... H04L 67/306 726/4 |
| 2007/0073882 A1 | 3/2007 | Brown et al. |
| 2009/0323972 A1* | 12/2009 | Kohno ................ G06F 21/6245 380/284 |
| 2009/0327694 A1* | 12/2009 | Sood ..................... H04L 63/123 713/150 |
| 2012/0182977 A1* | 7/2012 | Hooli ................ H04W 72/1278 370/336 |

OTHER PUBLICATIONS

WebDiary.com: "Opting-Out of Google Location Server" Nov. 15, 2011.
GigaOM: "Wifarer's Mobile App Doesn't Just Map the Indoors: It Maps the Objects Within" Aug. 1, 2012.
Orava et al. "Temporary MAC Addresses for Anonymity" May 2002; IEEE 802.11-11-02-261r2.
Edney et al. "Temporary MAC Addresses for Anonymity" Jan. 2002; IEEE 802.11-02/109r0.
Stackoverflow.com: "Is it Possible to Have Encryption with Multiple Private Keys (PHP)?" Jan. 5, 2011.
PHP: "Openssl_seal" Aug. 2, 2012.

* cited by examiner

*Primary Examiner* — Kambiz Zand
*Assistant Examiner* — Stephen Sanders
(74) *Attorney, Agent, or Firm* — Patterson + Sheridan LLP

(57) ABSTRACT

In an example embodiment, a wireless device is operable to advertise a policy on the inclusion of the wireless device in a radio frequency map. For example, the wireless device may transmit a signal comprising a field in an extended capabilities information that indicates whether mapping of the wireless device is permissible. As another example, the wireless device may perform certain actions, such as changing media access control address, changing transmit power, and/or vary response times to prevent accurate mapping of the location of the wireless device.

8 Claims, 6 Drawing Sheets

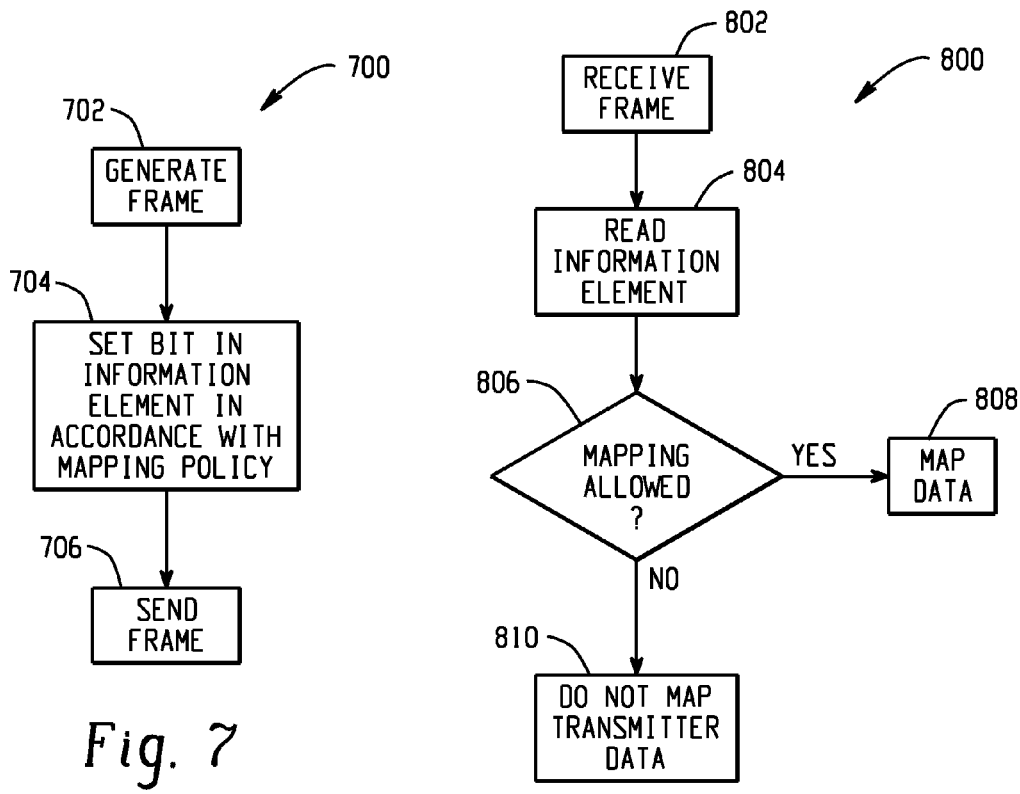
Fig. 7
Fig. 8
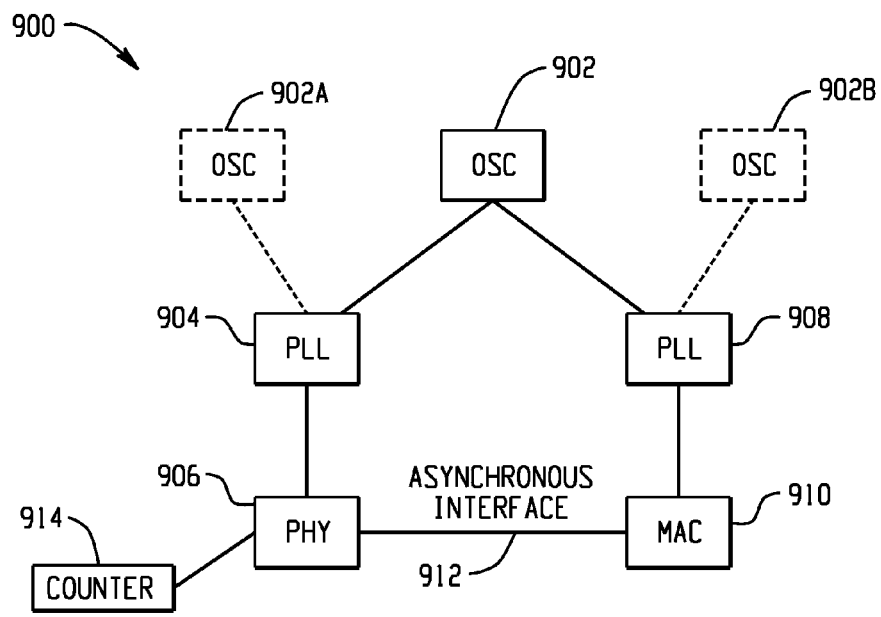
Fig. 9

LOCATION SERVICES FOR A WIRELESS DEVICE

TECHNICAL FIELD

The present disclosure relates generally to providing the location and/or cloaking the location of a wireless device.

BACKGROUND

Wireless devices can be equipped with capabilities for providing location services. For outdoor environments, global positioning satellites (GPS) can be employed. However, GPS doesn't always work well in indoor environments. Thus, for indoor environments, WIFI networks are frequently employed for providing location services. For example, a site survey may be conducted and a radio frequency (RF) topology map can be constructed. However, a venue may prefer to keep the location of its access points private. For example, a venue may wish to monetize location services. Other reasons may include security and/or privacy.

BRIEF DESCRIPTION OF THE DRAWINGS

The accompanying drawings incorporated herein and forming a part of the specification illustrate the example embodiments.

FIG. 7 is a block diagram illustrating an example of a method for transmitting a management frame that includes an information element to specify whether mapping is allowed.

FIG. 8 is a block diagram illustrating an example of a method that determines whether mapping is allowed from an information element.

FIG. 9 is a block diagram of an apparatus operable to generate a predefined delay employed for sending a response to a frame.

OVERVIEW OF EXAMPLE EMBODIMENTS

Figure 1:
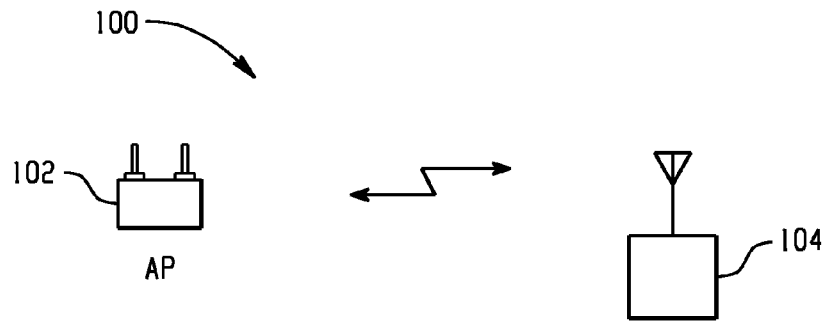
FIG. 1 illustrates an example of a venue with a wireless device configured in accordance with example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an example embodiment, a wireless device is operable to prevent inclusion of the wireless device or characteristics of the wireless device associated with geographic coordinates, such as a map. For example, the wireless device transmits a signal comprising an extended capabilities information that indicates whether mapping of the wireless device is permissible. As another example, the wireless device may perform certain actions, such as changing media access control address, changing transmit power, and/or varying response times to prevent accurate mapping of the location of the wireless device.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, an access point (AP) Mapping Privacy field is added to an Extended Capabilities Information Element (IE) in predefined frames such as Beacons and Probe Responses for indicating a policy for mapping the AP's characteristics. The field may be embodied as: 1) a a single bit, where a first value for the field (e.g., 0) can be employed to indicate no mapping policy or unrestricted mapping is allowed and a second value for the field (e.g., 1) can be employed to indicate the mapping is "prohibited," however, there may be exceptions (such as for security, for network access/management or for any private agreement with the AP administrator); 2) a single bit, where a first value for the field (e.g., 0) can be employed to indicate no mapping policy or unrestricted mapping is allowed and a second value for the field (e.g., 1) can be employed to indicate the mapping is subject to a "privacy policy" that may include exceptions (such as for security, for network access/management) that can be retrieved via a subsequent exchange; 3) two bits, where a first value for the field (e.g., 0) can be employed to indicate no mapping policy, a second value for the field (e.g., 1) can indicate unrestricted mapping is allowed, a third value for the field (e.g., 2) can be employed to indicate the mapping is prohibited that may include exceptions (such as for security, for network access/management or for any private agreement with the AP administrator); and the fourth value is restricted for future use; or 4) two bits, where a first value for the field (e.g., 0) can be employed to indicate no mapping policy, a second value for the field (e.g., 1) can indicate unrestricted mapping is allowed, a third value for the field (e.g., 2) can be employed to indicate the mapping is prohibited that may include exceptions (such as for security, for network access/management); and the fourth value and a second value for the field (e.g., 3) can be employed to indicate the mapping is subject to a "privacy policy" with exceptions (such as for security, for network access/management) that must be retrieved via a subsequent exchange. In the above text, "prohibited" and "privacy policy" are quoted to indicate that their effect varies according to local laws: in some jurisdictions they may indeed indicate "prohibited" and "privacy policy"; but in other jurisdictions they may instead indicate "requested to be not undertaken" and "requested privacy policy" respectively. In an example embodiment, the privacy policy, also called AP Mapping Privacy Policy or Requested AP Mapping Privacy Policy can be made obtained via a Native GAS (Get Advertising Services) Query Request. The AP characteristics subject to the (requested) prohibition or privacy policy may include, but are not limited to MAC (Media Access Control) address, BSSID (Basic Service Set Identifier), SSID (Service Set Identifier), authentication policy, geolocation of the AP or its antennas, map of the signal strength or transmission time of flight from the AP, and may also include derived or related parameters such as transmitter address, path loss, time of flight to the AP, round trip time to/from or from/to the AP etc.

In an example embodiment, ANQP (Access Network Query Protocol; see e.g., the Institute of Electrical and Electronics Engineers "IEEE" 802.11u specification published February 2011) elements are employed to communicate a mapping policy. As will be described in more detail herein, an AP Mapping Policy Request and an AP Mapping Policy Response elements are defined to communicate the mapping policy.

In an example embodiments, an AP may periodically or aperiodically change its MAC address. In particular embodiments, the MAC address change can employ a MAC address broker. The MAC address broker can be provided with a library of MAC addresses. A particular network may be provided with a set of MAC addresses. After a predefined time period, the set of MAC addresses may be returned to the MAC address broker, which will provide a different set of AP MAC addresses.

Because changing a MAC address would cause existing clients to believe their existing AP has disappeared and a new AP has appeared, which may cause the clients to scan for APs to associate, APs may be inhibited from changing their MAC addresses while clients are still associated. However, APs may employ BSSID transition (forced roaming) from the AP's old MAC address to a neighboring AP or to the AP's new MAC address to ensure that the client doesn't lose connectivity. In some embodiments, there may be entities (attacking AP MAC address database managers) that are attempting to map APs or the characteristics of APs. The AP MAC database managers are able to get clients to scan and report the results of the scan to the entity. In this case, APs may wish to defer the change of their MAC addresses until no clients are around, or to send no traffic for a variable period of time or to transmit at a variable transmit (TX) power.

In an example embodiment, the MAC address is changed when there are no clients within a predefined proximity of the AP. In another example embodiment, if a client within a predefined proximity of the AP exhibits behavior characteristic of a client that is performing RF mapping, changing of the MAC address may be delayed until there are no clients that appear to be performing RF mapping within a predefined proximity of the AP. In yet another example embodiment, the AP may wait a period of time after changing its MAC address before transmitting.

In an example embodiment, to monetize location services, a Mobility Services Engine (MSE) can publish new AP MAC addresses/locations to subscribers whenever the MAC addresses change or when a subscriber roams into the coverage area of the network, in exchange for something of value, such as money or space on the end device's User Interface ("UI") for advertising etc.

In an example embodiment, the same MAC address may be sent by multiple APs, and in some embodiments on multiple networks, so that the MAC address appears at multiple locations so that the actual location of the transmitter of that MAC address is unreliable and the MAC address might be given less weight and/or discarded by the attacking AP MAC address database manager. For example, an AP owner operating an AP at one venue wishes that MAC address to appear at many other locations. A "re-seeder" accepts a MAC address from the AP owner and forwards the MAC address to other parties to retransmit the MAC address on their networks via beacons and probe responses. To avoid side-effects, the reseeded transmissions could have a different SSID with WPA-PSK (WiFi Protected Access-Pre-Shared Key) enabled and employing a private, complicated password. The retransmission of the MAC address by other parties must be out of range of the original AP and anything in range of that AP.

In an example embodiment, the re-seeded MAC address is transmitted by a mobile platform (e.g. on a bus or light rail on a route that is at least a predefined distance, for example >>200 meters, from the original AP). In particular embodiments, the re-seeded MAC address is transmitted in the same city/metropolitan area as the original AP.

In an example embodiment, the MAC address re-seeder can use AP owners as "other parties." For example a network may submit one AP MAC address to the re-seeder, and receive five MAC addressees to retransmit at random locations.

In an example embodiment, the Short-Inter Frame Space (SIFS) can be varied. Round trip time (RTT) calculations rely on a known delay between the AP receiving the packet and sending a response to the client. Packet exchanges include, but are not limited to RTS/CTS (Request to Send/Clear to Send), unicast probe request messages/Acknowledgement (ACK) messages, etc.

In an example embodiment, the SIFS delay can be implemented via a hardware state machine. For example, the hardware state machine may reside in the MAC (processor) that uses a different clock domain that is not synchronized with the PHY clock domain and/or uses different Phase Locked Loops (PLLs), so that the delay is variable.

In an example embodiment, the AP adds a configurable delay to its SIFS responses. In particular embodiments, the delay can vary. The delay can be varied by time period, for example instead of packet by packet, the delay may be varied hourly, daily, and/or triggered less than a predetermined number of clients are present to detect the change in SIFS. In particular embodiments, some clients, such as paid subscribers, may be provided with the true SIFS value, e.g., real SIFS=SIFS+delay to enable these clients to accurately determine round trip time.

In an example embodiment, an AP varies its transmit power. For example, an AP adds/subtracts a few dB of dither from the RRM (Radio Resource Manager) recommended TX power. For example, an AP may randomly add/subtract 0.5 dB to their TX power over hours/days as a random walk within a bounded range (e.g., +−2 or +−3 dB of the RRM recommended value). An AP's TX power should be toggled even if the RRM determines that the transmit power does not need to change to meet the needs of normal operation. In an example embodiment, an AP may send unencrypted transmit power data that is different than the actual transmit power, which is sent encrypted.

In particular embodiments, an AP may try to detect clients performing RF fingerprint capture and act accordingly. For example, an AP may determine that a client is performing an RF fingerprint capture by observing certain characteristic behaviors of the client. For example, if a client appears to be actively scanning, where probe requests are sent almost "continuously" on all channels (for example if the time (or average time or mean time) between probe requests is less than a predetermined threshold). As another example, for detecting either active or passive scanning, a client may move consistently but slowly, and visit most of the accessible locations on a floor, and/or other floors. In an example embodiment, because Android phones have a more open location API (Application Program Interface) and thus are more likely to be "offenders"; the AP may detect Android clients based on their characteristics. A Cisco Identity Services Engine (ISE) device may be employed to detect Android clients.

In an example embodiment, if a client is determined to be performing active RF fingerprint capture, the AP may vary the transmit power of responses to that client more frequently. In addition, the AP may vary its transmit power more frequently for clients that are moving (and so are more likely to be phones/tablets, etc., that are using a location application). In particular embodiments, the transmit power may be varied by type of client. For example, packets directed to devices whose API is less amenable to RF fingerprint capture. In other particular embodiments, the transmit power may be varied for certain types packets, such as multicast packets and/or beacons. In particular embodiments, if a client is identified as a calibrating client for a location (for example a mall), information identifying the client (such as the client's MAC address/telephone number, etc.) can be distributed to other locations (for example other malls).

In an example embodiment, an encryption key, is employed to encrypt location data. For example, a symmetric key may be employed. The AP would encrypt the symmetric key using a client's public key so that only clients possessing the symmetric key can obtain the location data. The encrypted data may include, but is not limited to data representative of the AP's real MAC address, the AP's current transmit power, any delay added to a SIFS time, and/or fake APs in the vicinity. In particular embodiments, selected applications may be encrypted so that only particular users selected from a group of users can decrypt data for the application. For example, the symmetric key may be further encrypted using a public key associated with a particular application. Thus, only users having the private key associated with the particular application can decrypt the symmetric key for the application. After obtaining the symmetric key, the data can be decrypted.

In an example embodiment, a venue owner can provide a SIFS that is accurate to the clock cycle. For example, the MAC FSM (Finite State Machine) is in one clock domain and the PHY FSM is in another (second) clock domain. Upon receiving a frame, the PHY FSM starts a count-down timer preloaded with a slightly overlength count. In parallel, the PHY FSM notifies the MAC FSM of the received frame via an asynchronous interface, and the MAC FSM determines that a response is required. After a SIFS (or slightly less) time period, the MAC FSM notifies the PHY FSM via the asynch interface that the PHY FSM should start transmitting. The PHY FSM receives the notification from the MAC FSM, however, the PHY FSM waits until its local count-down timer is zero before actually transmitting the frame. In this way, the SIFS time can be determined based on a single counter clocked by a single clock that is counting down from the same value (e.g., SIFS plus delta).

In an example embodiment, a network may employ "fake APs" to confuse devices attempting to create an RF map. For example, the fake AP may send beacons with a fake MAC address and/or the MAC address of another AP in the vicinity.

FIG. 1 illustrates an example of a venue 100 with a wireless device (such as an access point) 102 in accordance with example embodiment. In the illustrated example, a wireless device 104 can receive signals from the AP 102. The AP 102 and wireless device 104 suitably comprise logic for implementing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, a one bit access point (AP) Mapping Privacy field is added to the Extended Capabilities Information Element (IE) in Beacons and Probe Responses sent by AP 102 for indicating a policy for mapping the AP 102's characteristics. A first value for the bit (e.g., 0) can be employed to indicate unrestricted mapping is allowed. A second value for the bit (e.g., 1) can be employed to indicate the mapping is restricted and/or subject to a requested policy called the AP Mapping Privacy Policy. In an example embodiment, the AP Mapping Privacy Policy can be obtained via a Native GAS (Get Advertising Services) Query Request. The AP characteristics may include, but are not limited to MAC (Media Access Control) address, BSSID (Basic Service Set Identifier), SSID (Service Set Identifier), authentication policy, geolocation of the AP or its antennas, map of the signal strength or transmission time for the AP, and may also include derived parameters such as TA, pathloss, etc.

In an alternative embodiment, the Mapping Privacy field is a two bit field. For example, the two bit field may include values indicating that there is no mapping policy (e.g., 0) mapping, except for limited purposes such as for joint resource management optimization and/or wireless intrusion protection is not allowed (e.g. 1), mapping is allowed (e.g., 2), and/or reserved for future use (e.g., 3).

Figure 2:
FIG. 2 illustrates an example of an access point mapping privacy policy request in a formatted extensible markup language string.
Figure 3:
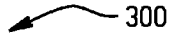
FIG. 3 illustrates an example of an access point mapping privacy policy response in a formatted extensible markup language string.

In an example embodiment, ANQP (Access Network Query Protocol; see e.g., the Institute of Electrical and Electronics Engineers "IEEE" 802.11u specification published February 2011) elements are employed to communicate a mapping policy. For example, FIG. 2 illustrates an example of an AP Mapping Privacy Policy Request 200 in a formatted extensible markup language string. FIG. 3 illustrates an example of an AP Mapping Privacy Policy Response 300 in a formatted extensible markup language string. Wireless device 104 could send a frame comprising the AP Mapping Privacy Policy Request 200 to determine what constraints on the mapping of AP 102 are requested. AP 102 would respond to the AP Mapping Privacy Policy Request 200 with an AP Mapping Privacy Policy Response 400.

In an example embodiment, the AP 102 may periodically or aperiodically change its MAC address. In an example embodiment, the AP 102 may be configured with a set of MAC addresses. In another example embodiment, the AP 102 obtains MAC addresses from another device (see, for example, the MAC address broker described in FIG. 4 herein infra). The MAC addresses may be changed after a predetermined interval (such as daily, weekly, etc.).

Because changing a MAC address would cause existing clients to believe their existing AP has disappeared and a new AP has appeared, which may cause the clients to scan for APs to associate, the AP 102 may be inhibited from changing its MAC addresses while clients are still associated, such as wireless station 104. However, AP 102 may employ BSSID transition (forced roaming) to ensure the MAC address is changed within a predefined time interval.

In an example embodiment, the AP 102 adds a variable delay to responses that employ a Short-Inter Frame Space (SIFS). For example, wireless device 104 may employ a round trip time (RTT) calculation, which relies on a known delay between the time AP 102 receives the packet and when AP 102 sends a response. Packet exchanges where a variable delay may be inserted, include but are not limited to RTS/CTS messages, unicast probe requests, Acknowledgement (ACK) messages, etc.

In an example embodiment, the delay added to the SIFS may change. For example, the delay added to the SIFS may change periodically or aperiodically. In an example embodiment, the delay added to the SIFS is changed when there are no clients within a predefined proximity of the AP. In another example embodiment, the SIFS is changed upon determining there are no clients that are performing (or suspected of performing) mapping within a predefined proximity. In yet another example embodiment, the AP may not send any transmissions for a predefined time period upon changing the delay added to the SIFS.

In an example embodiment, the AP 102 varies its transmit power. For example, an AP adds/subtracts a few dB of dither from the RRM (Radio Resource Manager) recommended TX power. For example, the AP 102 may randomly add/subtract 0.5 dB to their TX power over hours/days as a random walk within a bounded range (e.g., +−2 or +−3 dB of the RRM recommended value). In an example embodiment, AP 102's TX power should be toggled even if the signal strength as measured by the RRM during normal operation appears to be the same at different AP transmit power levels.

In particular embodiments, the AP 102 may try to detect clients (for example wireless device 104) that are performing RF fingerprint capture and act accordingly. For example, the AP 102 may determine whether the client 104 is performing an RF fingerprint capture by observing certain characteristic behaviors of the client 104. For example, if the client 104 appears to be active scanning, where probe requests are sent almost "continuously" on all channels (for example if the time (or average time or mean time) between probe requests is less than a predetermined threshold). As another example, for detecting either active or passive scanning, the client 104 may move consistently but slowly, and visits most of the accessible locations on a floor, and/or other floors. In an example embodiment, because Android phones have a more open location API (Application Program Interface) and thus are more likely to be "offenders"; the AP may detect Android clients based on ISE device.

In an example embodiment, if the client 104 is determined to be performing active RF fingerprint capture, the AP 102 may vary the transmit power of responses to that client more frequently. In addition, the AP 102 may vary its transmit power more frequently for clients that are moving (and so are more likely to be phones/tablets, etc. that are using a location application). In particular embodiments, the transmit power may be varied by type of client. For example, packets directed to devices whose API is less amenable to RF fingerprint capture. In other particular embodiments, the transmit power may be varied for certain types of packets, such as multicast packets and/or beacons. In particular embodiments, if a client is identified as a calibrating client for a location (for example a mall), information identifying the client (such as the client's MAC address/telephone number, etc.) can be distributed to other locations (for example other malls).

In an example embodiment, a symmetric key, is employed to encrypt location data. The AP 102 would encrypt location data using the symmetric key, and provide the symmetric key to a selected client by encrypting the symmetric key with a selected client's public key. Thus only clients possessing the symmetric key can obtain the location data. The encrypted data may include, but is not limited to data representative of the AP's real MAC address, the AP's current transmit power, any delay added to a SIFS time, and/or fake APs in the vicinity. In particular embodiments, selected applications may be encrypted so that only particular users selected from a group of users can decrypt data for the application. For example, the symmetric key may be further encrypted using a public key associated with a particular application. Thus, only users having the private key associated with the particular application can decrypt the symmetric key for the application. After obtaining the symmetric key, the data can be decrypted.

In an example embodiment, AP 102 can provide a SIFS that is accurate to the clock cycle, which can facilitate round trip time calculations. For example, a MAC FSM is in one clock domain and a PHY FSM is in another asynchronous clock domain. Upon receiving a frame, the PHY FSM starts a count-down timer preloaded with a slightly overlength count value. In parallel, the PHY FSM notifies the MAC FSM of the received frame via an asynchronous interface between the MAC and PHY, and the MAC FSM determines that a response is required. After a SIFS (or slightly less) time period, the MAC FSM notifies the PHY FSM via the asynchronous interface that the PHY FSM should start transmitting. The PHY FSM receives the notification from the MAC FSM, however, the PHY FSM waits until its' local count-down timer is zero before actually transmitting the frame. In this way, the SIFS time can be determined based on a single counter clocked by a single clock that is counting down from the same value (e.g., SIFS plus delta).

Figure 4:
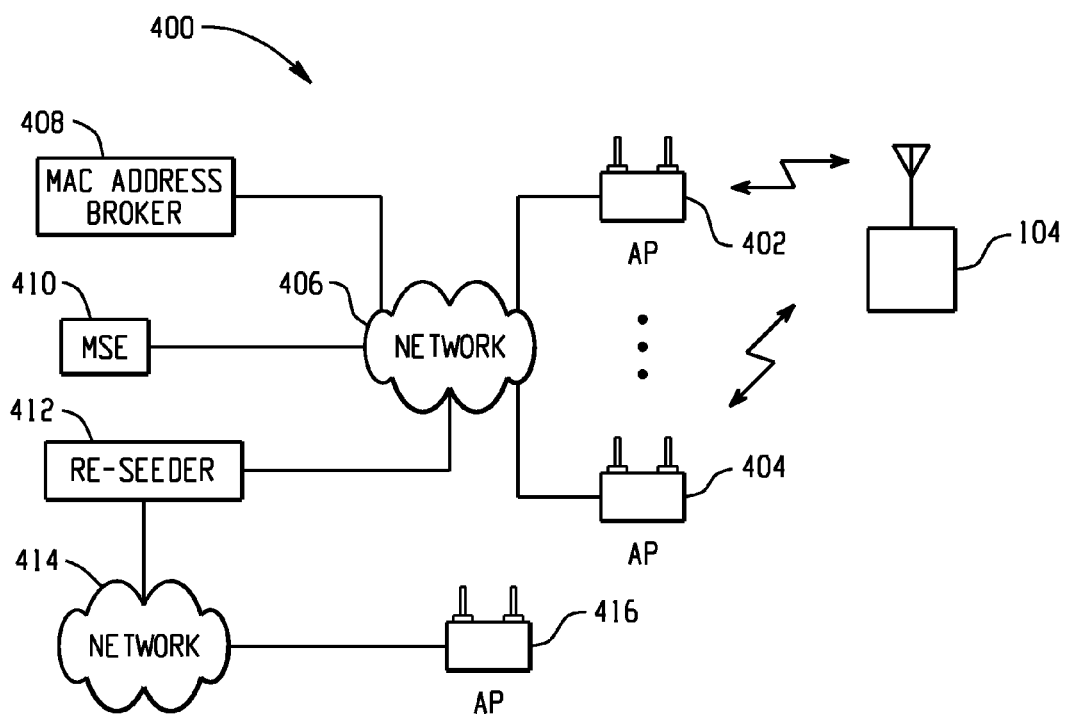
FIG. 4 illustrates an example of a network that comprises a plurality of access points in accordance with an example embodiment.

FIG. 4 illustrates an example of a network 400 with a plurality of access points 402, 404 in accordance with an example embodiment. The illustrated example shows two access points 402, 404; however, those skilled in the art should readily appreciate that any physically realizable number of access points may be employed. In an example embodiment, access points 402, 404 may be operable to perform the functionality described herein supra for AP 102 in FIG. 1. APs 402, 404 are coupled to a network 406.

In an example embodiments, APs 402, 404 may periodically or aperiodically change their MAC addresses. In particular embodiments, the MAC address change can employ a MAC address broker 408. The MAC address broker 408 can be provided with a library of MAC addresses. A particular network, such as network 406, may be provided with a set of MAC addresses. After a predefined time period, the set of MAC addresses may be returned to the MAC address broker 408, which will provide a different set of AP MAC addresses to the network.

Because changing a MAC address would cause existing clients (e.g., client 104) to believe their existing AP has disappeared and a new AP has appeared, which may cause the clients to scan for APs to associate, APs 402, 404 may be inhibited from changing their MAC addresses while any clients are still associated. However, APs 402, 404 may employ BSSID transition (forced roaming) to ensure that the MAC address is changed within a predefined time interval.

In an example embodiment, to monetize location services, a Mobility Services Engine (MSE) 410 can publish new AP MAC addresses/locations to subscribers whenever the MAC addresses change or when a subscriber roams into the coverage area of the network.

In an example embodiment, MAC addresses may be sent by multiple APs, 402, 404 and in some embodiments on multiple networks, so that the MAC address appears at multiple locations so that the actual location of the transmitter of that MAC address is unreliable and the MAC address might be given less weight and/or discarded by the attacking AP MAC address database manager (e.g., Skyhook, Google, Apple, etc.). For example, an AP owner operating an AP at one venue wishes that MAC address to appear at many other locations. A "re-seeder" 412 accepts a MAC address from the AP owner and forwards the MAC address to other parties to retransmit the MAC address on their networks (e.g., network 414) via beacons and probe responses. To avoid side-affects, the reseeded transmissions could have a different SSID with WPA-PSK (WiFi Protected Access-Pre-Shared Key) enabled and employing a private, complicated password; and/or is transmitted by an AP (e.g., AP 416) that is out of range of the original AP (e.g., one of APs 402, 404).

In an example embodiment, the re-seeded MAC address is transmitted by a mobile platform (e.g., on a bus or light rail on a route that is at least a predefined distance, for example >>100 meters, from the original AP). In particular embodiments, the re-seeded MAC address is transmitted in the same city/metropolitan area as the original AP.

In an example embodiment, the MAC address re-seeder 412 can use AP owners as "other parties." For example a network 406 may submit one AP MAC address to the re-seeder 412, and receive five MAC addresses to retransmit at random locations.

In an example embodiment, the network 406 may comprise "fake APs" to confuse devices attempting to create an RF map. For example, AP 402 may be a real AP while AP 404 is a fake AP. The fake AP 404 may send beacons with a fake MAC address and/or the MAC address of another AP in the vicinity. In particular embodiments, the fake AP 404 may retransmit MAC addresses supplied by the re-seeder 412.

Figure 5:
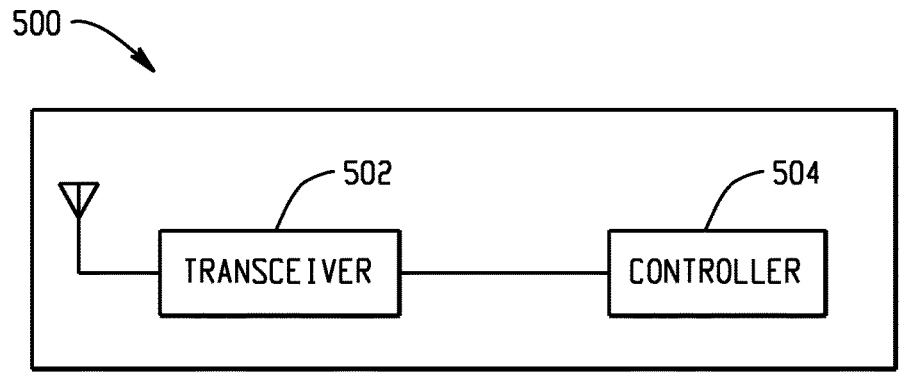
FIG. 5 illustrates an example of an apparatus upon which an example embodiment can be implemented.

FIG. 5 illustrates an example of an apparatus 500 upon which an example embodiment can be implemented. The apparatus 500 comprises a transceiver 502 and a controller 504 that can send and receive data via the transceiver 502. The controller 504 comprises logic for performing the functionality described herein.

In an example embodiment, the apparatus 500 is employed for implementing an access point. For example, the apparatus 500 can be employed for implementing access point 104 in FIG. 1, access point 402 in FIG. 4, access point 404 in FIG. 4 and/or access point 416 in FIG. 4. For example, controller 504 may generate management frames comprising an extended capabilities IE as described herein. The extended capabilities IE may be one or more bits (or XML data in a predetermined format) for specifying whether mapping of the signal parameters or location of transmitter 502 is permitted. Controller 504 may vary the output power of transceiver 502 and/or add a variable delay to responses and/or specify the amount of delay for a response.

The apparatus 500 may also be employed for implementing the functionality of other devices. For example, the apparatus 500 may be employed for implementing the functionality of MAC address broker 408 in FIG. 4, MSE 410 in FIG. 4, and/or re-seeder 412 in FIG. 4.

Figure 6:
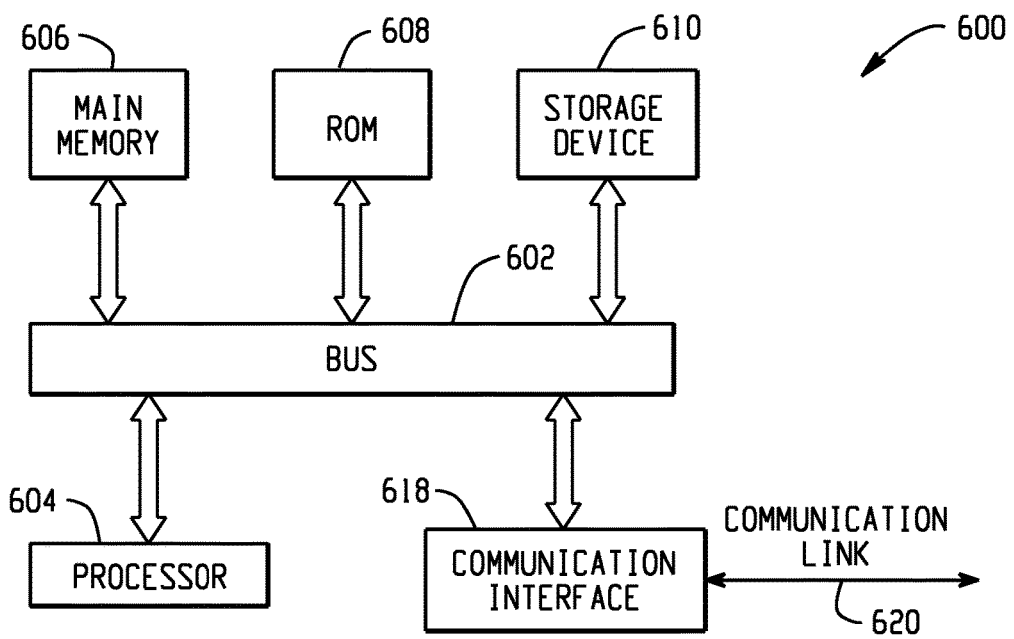
FIG. 6 illustrates an example of a computer system upon which an example embodiment can be implemented.

FIG. 6 illustrates an example of a computer system 600 upon which an example embodiment can be implemented. Computer system 600 is suitable for implementing AP 102 (FIG. 1), wireless device 104 (FIG. 1 and FIG. 4), APs 402, 404 (FIG. 4), MAC Address Broker 408 (FIG. 4), MSE 410 (FIG. 4), Re-seeder 412 (FIG. 4), and/or controller 504 (FIG. 5).

Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, optical disk, and/or flash storage, is provided and coupled to bus 602 for storing information and instructions.

An aspect of the example embodiment is related to the use of computer system 600 for providing location services for a wireless device. According to an example embodiment, providing location services for a wireless device is provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 604 for execution. Such a medium may take many forms, including but not limited to non-volatile media, and volatile media. Non-volatile media include, for example, optical or magnetic disks, such as storage device 610. Volatile media include dynamic memory such as main memory 606. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

In an example embodiment, computer system 600 also includes a communication interface 618 coupled to bus 602. The communication interface 618 provides a two-way data communication link 620 coupling computer system 600 to external devices. For example, communication interface 618 may be a local area network (LAN) card to provide a data communication connection to a compatible LAN. As another example, communication interface 618 may be an integrated services digital network (ISDN) card or a modem to provide a data communication connection to a corresponding type of telephone line. Wireless links may also be implemented. In any such implementation, communication interface 618 sends and receives electrical, electromagnetic, or optical signals that carry digital data streams representing various types of information.

In view of the foregoing structural and functional features described above, methodologies in accordance with example embodiments will be better appreciated with reference to FIGS. 7-8. While, for purposes of simplicity of explanation, the methodologies of FIGS. 7-8 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required. The methodologies described herein are suitably adapted to be implemented in hardware, software in a non-transitory computer readable medium of execution by a processor, or a combination thereof.

FIG. 7 is a block diagram illustrating an example of a method 700 for transmitting a management frame that includes a field in an information element to specify whether mapping is allowed or restricted. Method 700 may be implemented by AP 102 (FIG. 1), AP 402 (FIG. 4), AP 404 (FIG. 4), controller 504 (FIG. 5), and/or computer system 600 (FIG. 6).

At 702, the management frame is generated. The management frame includes a field in an extended capabilities information element or other element that indicates whether mapping of the transmitter's location is "allowed" in a general sense (e.g., unrestricted prohibited, requested to be prohibited, subject to a privacy policy, subject to a requested privacy policy, etc). In an example embodiment, the mapping privacy field in the extended capabilities information element comprises at least one bit. For example, one bit may be employed to indicate whether mapping is allowed; however, additional bits may also be employed to indicate circumstances when mapping may be allowed (for example mapping may be allowed for non-commercial purposes) or whether the AP mapping privacy policy is available via a subsequent request.

At 704, the field (e.g., bit or bits) in the extended capabilities information element or other element is set in accordance with the mapping policy. In particular embodiments, the AP is configured to respond to requests for AP mapping privacy policy. For example, the policy may be retrieved by a Native GAS (Get Advertising Services) Query Request/Response. The policy request and/or response may be sent as a formatted XML (extensible markup language) stream with predefined fields that indicate whether, or under what circumstances, mapping is allowed. The XML string may be sent in response to receiving an AP mapping privacy policy request formatted.

FIG. 2 illustrates an example of an AP Mapping Privacy Policy Request 200 in an XML string format. FIG. 3 illustrates an example of a an AP Mapping Privacy Policy Response 300 formatted in an XML string format.

At 706, the management response frame is transmitted. The management frame may be any suitable frame such as a beacon or probe response frame.

FIG. 8 is a block diagram illustrating an example of a method 800 that determines whether mapping is allowed from a field in an information element. Method 800 may be implemented by wireless device 104 (FIGS. 1 and 4), controller 504 (FIG. 5), and/or computer system 600 (FIG. 6).

At 802 a frame is received from a wireless device, such as an AP. The frame may be a beacon frame, probe response frame, a response (see e.g., AP Mapping Privacy Policy Response 400 in FIG. 4) to an AP Mapping Privacy Policy Request (see e.g., AP Mapping Privacy Policy Request 300 in FIG. 3).

At 804, an information element in the frame received is read. This enables the receiver to determine whether mapping of the transmitter that transmitted the frame is allowed, not allowed, or if the privacy policy can be retrieved after a request elicits a response containing the privacy policy.

At 806, a determination is made whether mapping of the transmitter is allowed. If mapping is allowed (YES), at 808, data representative of the transmitter is included in the map. For example, the data may include the transmitter's location and/or measured signal parameters such as received signal strength indication (RSSI) at the client's location and other places that the client visits. If at 806, the determination was made that the mapping of the transmitter is not allowed (NO), at 810, the transmitter's data (e.g., location and/or RSSI) is not mapped.

In an example embodiment, mapping of the transmitter is subject to a privacy policy. A native GAS request may be sent to request the policy. A response to the request is received and parsed. The determination on whether mapping is allowed, and if so whether there are any restrictions (for example if forwarding of mapping data is prohibited), is based on the privacy policy.

FIG. 9 is a block diagram of an apparatus 900 operable to generate a predefined delay employed for sending a response to a frame. The apparatus 900 comprises an oscillator 902 coupled to phase lock loop (PLL) circuits 904, 908. In an example embodiment, a single oscillator may be coupled to PLL circuits 904, 908; however, in other embodiments, separate oscillators 902A, 902B may be coupled with PLL circuits 904, 908 respectively.

PHY processor 906 is coupled to PLL circuit 904. MAC processor 910 is coupled with PLL circuit 908. An interface (for example an asynchronous interface, but any suitable interface may be employed) 912 couples PHY processor 906 to MAC processor 910. A counter 914 is coupled with PHY processor 906.

In operation, when a frame is received by PHY processor 906, a signal is sent to the MAC processor 910, and concurrently, a counter 914, e.g., a downcounter initialized at a value is started. The PHY processor 906 waits for a signal from MAC 910 processor indicating whether to send a response to the frame. The PHY processor 906 receives a signal from the MAC processor 910 via interface 912 to send a response to the frame. The PHY processor 906 waits until counter 914 expires before sending the frame. Thus, the response time of apparatus 900 is fixed to an exact number of PHY clock cycles.

In an example embodiment, apparatus 900 may provide the expiry counts of counter 914 (e.g., the initial value of a downcounter) to a predetermined recipient. For example, the value of counter 914 may be sent to paid subscribers desiring accurate location data. The value of counter 914 may be varied to inhibit the ability of recipients who are not paid subscribers to accurately determine RTT.

Figure 10:
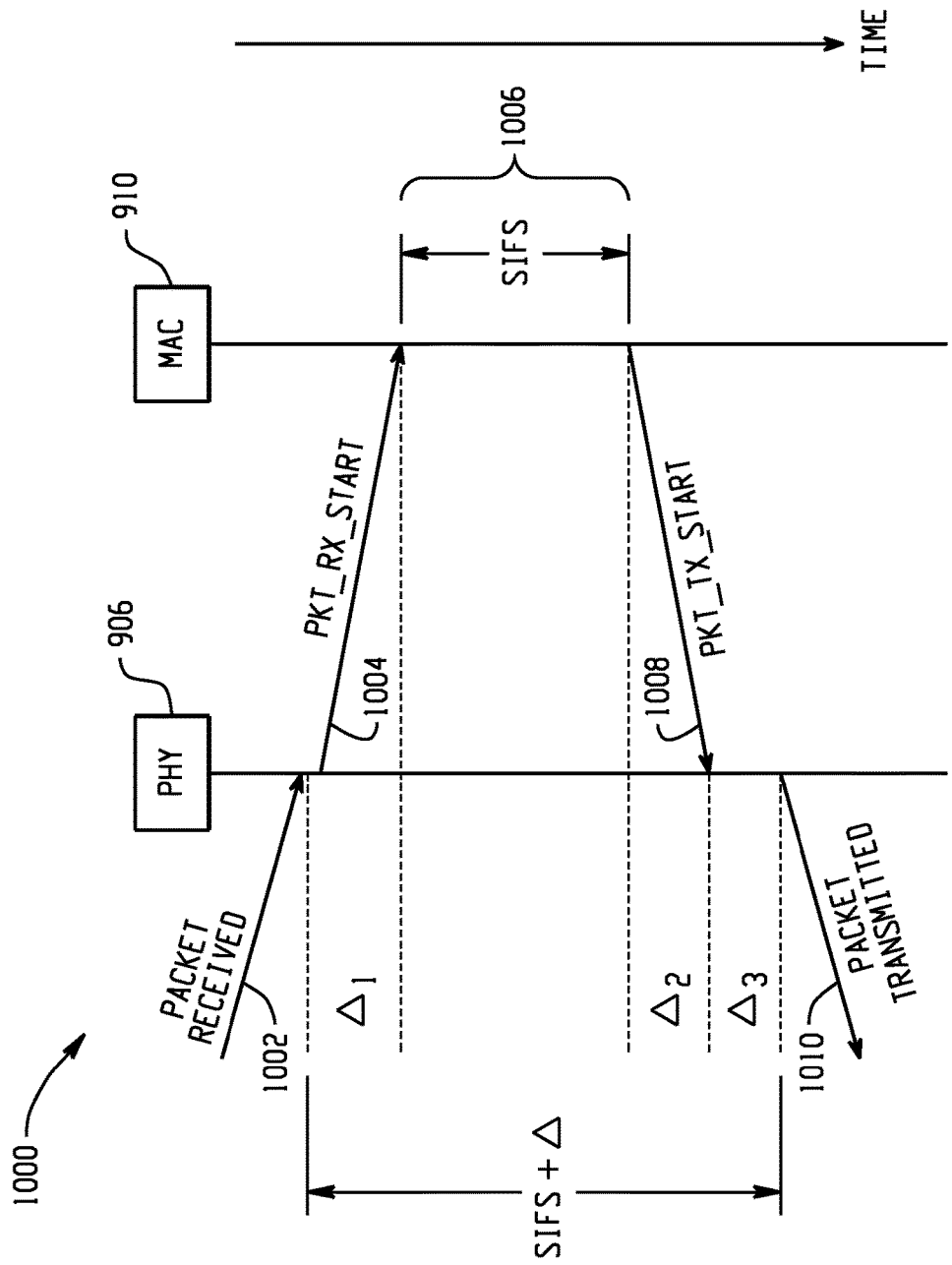
FIG. 10 is an example of a signal diagram for providing information about the predefined delay by the apparatus illustrated in FIG. 9.

FIG. 10 is an example signal diagram 1000 for providing information representative of the predefined delay by the apparatus 900 illustrated in FIG. 9. As illustrated by line 1002, a packet is received at the PHY processor 906. The PHY processor 906 sends a signal (PHY_RX_START) 1004 to the MAC processor 910 (for example via interface 912) and starts a timer. The MAC processor 910 determines the appropriate interframe space delay (SIFS in the illustrated example) 1006. After the interframe delay 1006, the MAC processor 910 sends a signal (PHY_TX_START) 1008 to the PHY processor 906 (for example via interface 912). The response 1010 is transmitted upon expiration of the timer.

In an example embodiment, the timer is set to a predefined time period that is longer than the interframe space delay (SIFS in this example, however, this technique can be employed with any IFS delay), or SIFS plus a predefined delay (or delta). The value of the predefined delay (delta) should be selected to accommodate delays (delta1 and delta2) for communications between the PHY processor 906 and MAC processor 910. Some extra delay (delta3) may also be included. In an example embodiment, the value of delta may be varied to inhibit the ability of certain devices to obtain accurate radio frequency mapping data.

Figure 11:
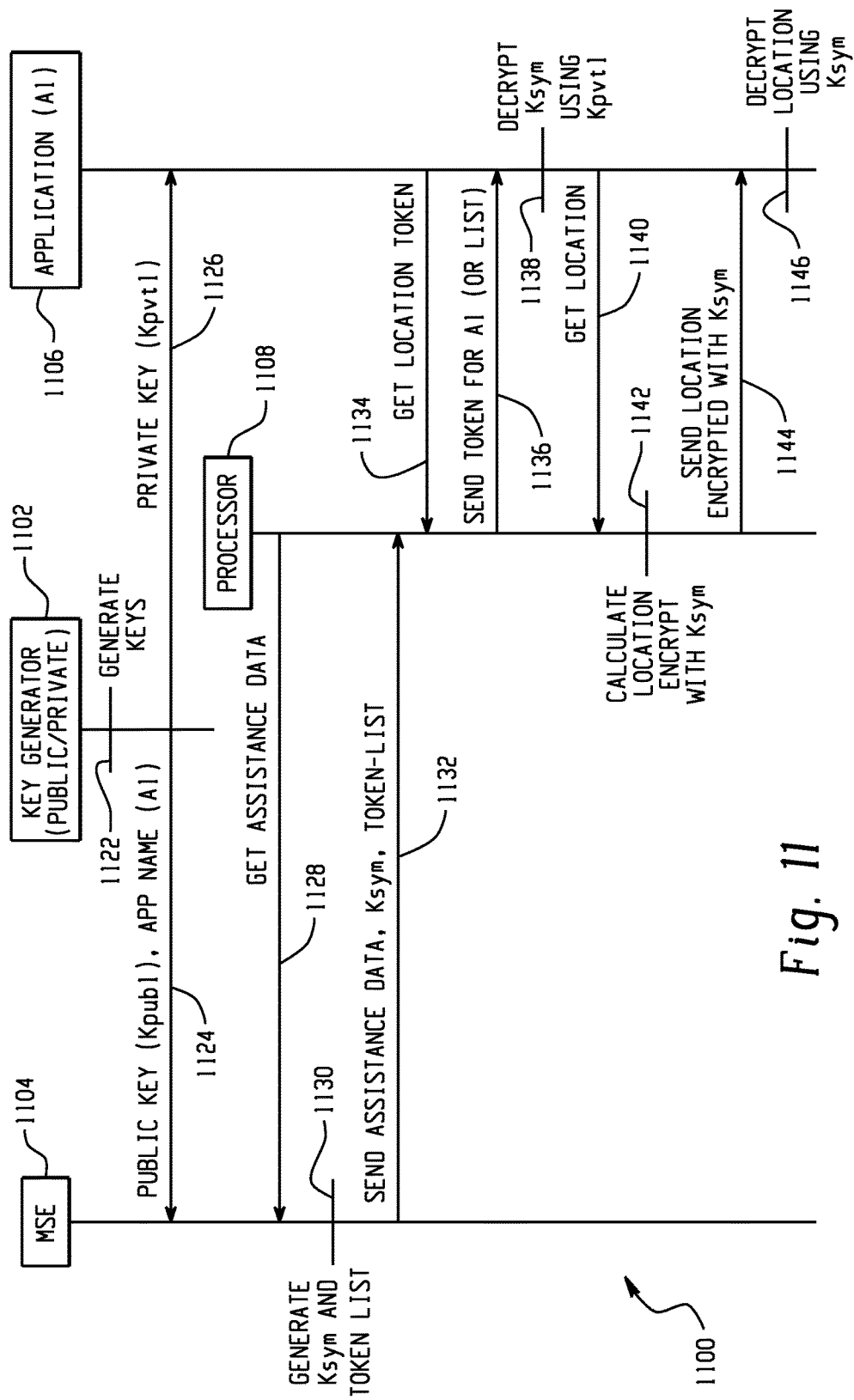
FIG. 11 is an example of a signal diagram for providing encrypted location information, where the location information can be encrypted in a manner such that the information can only be decrypted by an authorized application.

FIG. 11 is an example signal diagram 1100 for providing encrypted location information, where the location information can be encrypted so that the data can only be obtained by an authorized application. Location data (such as accurate location information) is encrypted employing a symmetric encryption key (Ksym). Ksym is further encrypted using an authorized application's public key. The authorized application uses its private key to extract Ksym. Once the application obtains Ksym, the application can decrypt the location data.

In the illustrated example, a Key Generator (e.g., a Key Server or other appropriate device) 1102 generates and distributes keys to a mobility services engine (MSE) 1104 that provides location data and for the application (A1) 1106. the application (A1) 1106 resides on a wireless device with a processor 1108.

As illustrated by 1122, Key Generator 1102 generates a Public Key/Private Key Pair (Kpub1/Kpvt1) for communications between MSE 1104 and Application (A1) 1106. The Public Key (Kpub1) and data identifying the application (A1 1106 in this example) for the public key is distributed to MSE 1104 as illustrated by 1124. The Private key (Kpvt1) is provided to the application 1106 as illustrated by 1126. Although the illustrated example shows 1124 and 1126 occurring at the same time, they may occur in any order (e.g., 1124 may occur first, or 1126 may occur first). In an example embodiment, the keys (Kpub1/Kpvt1) may expire after a predetermined time period (T1).

As illustrated by 1128, the processor 1108 sends a request to MSE 1104 to obtain assistance data. The MSE 1104 picks (or generates) a random Ksym. As illustrated at line 1130, the MSE 1104 also generates a token list. The token list can be structured as a list of application names and keys encrypted by the application's public key (for example, "A1", Ksym encrypted by Kpub1; "A2", Ksym encrypted by Kpub2, . . .).

At 1134, the application (A1) 1106 requests its location token from the processor 1108. The processor 1108 sends the response as illustrated by 1136. The processor 1108 may send the entire token list, as illustrated at line 1132, or send just the token for the application (A1) 1106. At 1138, the application (A1)1106 obtains Ksym by decrypting the token for application (A1) 1106 using its private key (Kpvt1).

At 1140, the application (A1) 1106 requests location data from processor 1108. At 1142 the processor 1108 calculates the location and encrypts the location with Ksym. At 1144, the processor 1108 sends the location data encrypted with Ksym to the application (A1) 1106. At 1146, the application (A1) 1106 decrypts the location using the Ksym obtained at 1138.

Described above are example embodiments. It is, of course, not possible to describe every conceivable combination of components or methodologies, but one of ordinary skill in the art will recognize that many further combinations and permutations of the example embodiments are possible. In accordance with an example embodiment, the techniques described herein may be combined. For example, an AP may send an extended capabilities information element, vary its transmit power, and add a variable delay to a SIFS. Accordingly, this application is intended to embrace all such alterations, modifications and variations that fall within the spirit and scope of the appended claims interpreted in accordance with the breadth to which they are fairly, legally and equitably entitled.

The invention claimed is:

1. Logic encoded in a non-transitory tangible computer readable medium for execution, and when executed by a processor operable to perform an operation, comprising:
    receiving a plurality of management frames from a plurality of access points;
    determining that the plurality of management frames each include an extended capabilities information element that comprises a bit that indicates whether mapping of a location of a transmitter of the respective management frame is allowed when constructing a radio frequency topology map;
    generating a radio frequency map of a physical environment, comprising:
        responsive to determining that a first management frame received from a first access point of the plurality of access points contains a first information element that indicates mapping for the first access point is allowed:
            determining first location information indicative of a location of the first access point; and
            including the first location information within the radio frequency map; and
        responsive to determining that a second management frame received from a second access point of the plurality of access points contains a second information element that indicates that mapping for the second access point is not allowed, excluding any location information indicative of a location of the second access point from the radio frequency map.

2. The logic set forth in claim 1, the operation further comprising:
    sending an access point mapping privacy policy request to determine whether access point location data may be included when constructing the radio frequency map, wherein the access point mapping privacy request is an extensible mark language string formatted in a predetermined format.

3. The logic set forth in claim 2, the operation further comprising:
    receiving a response to the access point mapping privacy policy request, wherein the extended capabilities information element is an extensible mark language string formatted in a predetermined format.

4. The logic set forth in claim 1, wherein each of the plurality of management frames includes a second extended capabilities information element comprising a single bit, wherein a predetermined value of the single bit indicates that mapping of a location of the transmitter of the respective management frame is allowed for a limited purpose.

5. The logic set forth in claim 1, wherein the extended capabilities information element comprises two additional bits, wherein a first predetermined value of the two additional bits indicates that inclusion of location information for the transmitter of the respective management frame is allowed for a limited purpose, and wherein a second predetermined value of the two additional bits indicates that the mapping privacy policy is available upon request.

6. The logic set forth in claim 1, wherein the extended capabilities information element comprises two additional bit, wherein a first predetermined value of the two additional bits indicates that inclusion of the transmitter location data is allowed for a limited purpose, and wherein a second predetermined value of the two additional bits indicates that forwarding of the transmitter location data is not authorized.

7. A method, comprising:
receiving, over a data communications network, a plurality of management frames from a plurality of access points;
determining that the plurality of management frames each include an extended capabilities information element that comprises a bit that indicates whether mapping of a location of a transmitter of the respective management frame is allowed when constructing a radio frequency topology map;
generating, by operation of one or more computer processors, a radio frequency map of a physical environment, comprising:
responsive to determining that a first management frame received from a first access point of the plurality of access points contains a first information element that indicates mapping for the first access point is allowed:
determining first location information indicative of a location of the first access point; and
including the first location information within the radio frequency map; and
responsive to determining that a second management frame received from a second access point of the plurality of access points contains a second information element that indicates that mapping for the second access point is not allowed, excluding any location information indicative of a location of the second access point from the radio frequency map.

8. A network device, comprising:
one or more computer processors; and
a non-transitory memory containing computer program code that, when executed by operation of the one or more computer processors, performs an operation comprising:
receiving, over a data communications network, a plurality of management frames from a plurality of access points;
determining that the plurality of management frames each include an extended capabilities information element that comprises a bit that indicates whether mapping of a location of a transmitter of the respective management frame is allowed when constructing a radio frequency topology map;
generating a radio frequency map of a physical environment, comprising:
responsive to determining that a first management frame received from a first access point of the plurality of access points contains a first information element that indicates mapping for the first access point is allowed:
determining first location information indicative of a location of the first access point; and
including the first location information within the radio frequency map; and
responsive to determining that a second management frame received from a second access point of the plurality of access points contains a second information element that indicates that mapping for the second access point is not allowed, excluding any location information indicative of a location of the second access point from the radio frequency map.

* * * * *